United States Patent [19]

Mills et al.

[11] Patent Number: 5,237,648
[45] Date of Patent: Aug. 17, 1993

[54] APPARATUS AND METHOD FOR EDITING A VIDEO RECORDING BY SELECTING AND DISPLAYING VIDEO CLIPS

[75] Inventors: Michael Mills; Jonathan Cohen, both of San Francisco, Calif.

[73] Assignee: Apple Computer, Inc., Cupertino, Calif.

[21] Appl. No.: 535,084

[22] Filed: Jun. 8, 1990

[51] Int. Cl.[5] .............................................. G06F 15/62
[52] U.S. Cl. .................................... 395/133; 395/134; 395/135; 395/152
[58] Field of Search ............................... 395/133-143, 395/152, 123-125

[56] References Cited

U.S. PATENT DOCUMENTS

| 4,538,188 | 8/1985 | Barker et al. | 360/14.3 |
| 4,752,836 | 6/1988 | Blanton et al. | 395/152 |
| 4,970,666 | 11/1990 | Welsh et al. | 395/123 |

Primary Examiner—Gary V. Harkcom
Assistant Examiner—Almis Jankus
Attorney, Agent, or Firm—Timothy D. Casey

[57] ABSTRACT

A video editing system comprising a computer system having a mass storage and a display, a video source, such as a video cassette recorder (VCR), camera, or optical disc player, and a video processor/controller linking the computer to the video source. The computer system functions under the direction of standard operating software and video editing software which provide the user with an interface for controlling both playback and clip editing of video information from the video source. Upon initialization of the editing system, the user is presented with at least a video window for displaying the video information, a control window for regulating playback of the video information, and a clip list window having a number of rows of edit windows organized under begin, end, and clip columns. The user controls playback of video from the video source within the video window through manipulation of standard playback direction and speed indicators. To mark a video frame in the video window as either a begin or end point of a video clip, the user clicks on the desired video frame with a mouse associated with the editing system. A small digitized version of the requested video frame is then created and attached to the cursor. This small digitized frame (SDF) can then be moved in tandem with the cursor from the video window to an edit window and released. Begin and end points of clips are created by releasing an SDF within an edit window under the appropriate column. Releasing an SDF within an edit window under the clip column causes that SDF to be entered as both the begin and end point of the clip. Numerous rows of edit windows can be created in a similar manner. When the begin and end edit windows in the same row are filled with different SDFs, the video frames between those respective points are digitized and automatically inserted into the clip column for that row in an animated form. SDFs can likewise be directly manipulated to modify the content or sequence of edit windows or to change the video frame being played within the video window.

21 Claims, 7 Drawing Sheets

APPARATUS AND METHOD FOR EDITING A VIDEO RECORDING BY SELECTING AND DISPLAYING VIDEO CLIPS

FIELD OF THE INVENTION

The present invention relates generally to video editing devices, and more particularly to a video editing system and technique for directly manipulating video frame images to edit clips of video information.

BRIEF DESCRIPTION OF PRIOR ART

Many computerized editing systems allow a user to preview large chunks of analog or digital audio and/or video information stored in one or more types of devices, such as VCR's, optical discs and sound players, and to mark particular segments of the information so as to create a digital clip of the previewed information for subsequent additional processing. The user of a typical video editor regulates the speed at which a video player displays the video information through either software controls or manual operation of a "jog-shuttle" potentiometer (a device which causes the video player to move forward or backward at a faster rate the further the jog-shuttle is turned in a particular direction).

The user typically creates digital video clips from the regulated video information through manual operation of hardware buttons, which electronically mark the "in" and "out" points of the video clip. In particular, to mark these in and out points, the user must manipulate the speed and direction of playback of the video information with the jog-shuttle until a desired frame is in view, and then mark the selected video frame by pressing either an "in" (beginning) hardware button or an "out" (ending) hardware button on the control panel of the video editor. An in button marks the start of a video clip and an out button marks the end of a video clip.

To replace an in or out point of a video clip, the user must first move the video information to the location of the replacement video frame, such as by using either the jog-shuttle or a "goto" hardware button. Goto buttons allow the user to move the video information back to a previously created in or out point. To replace the video frame once it has been located, the user must typically either press one of the in or out buttons to mark the frame or press some additional hardware buttons on the control panel of the editor so as to add or subtract frames of the clip. Some systems, which include a tape counter that monitors the frame number of displayed video segments, will allow a user to simply type in a frame number to create new in or out points.

Because low-end editing systems generally do not keep a log of in and out points, users must typically learn to write down the in and out points when using the editing system. Although higher-end systems generally do keep a list of marked clips, this list is typically expressed in a textual rather than a pictorial form. Some newer systems do, however, keep a list of images which either correspond to one frame in the clip or a pair of frames in the clip (the in and out points), which may be useful as a type of log, but even these newer systems continue to follow the in and out hardware button paradigm, and continue to limit trim and goto buttons to use with previously created in and out points, rather than with any frame or point in a list of marked clips.

SUMMARY OF THE INVENTION

A preferred embodiment of the video editing system of the present invention comprises a computer system having a mass storage and a display, an analog video source, such as a video cassette recorder (VCR), camera, or optical disc player, and a video processor/controller linking the computer to the video source. The computer system functions under the direction of standard operating software and video editing software which provide the user with an interface for controlling both playback and clip editing of video information from the video source. Upon initialization of the editing system, the user is presented with a video window for displaying the video information, a control window for regulating playback of the video information, and a clip list window having a number of rows of small edit windows organized under a begin column, an end column, and a clip column. The user controls the playback of video information from the video input device within the video window through manipulation of standard playback direction and speed indicators.

To mark a video frame in the video window as either a begin or end point of a video clip, the user clicks on the desired video frame with a mouse associated with the editing system. A small digitized version of the requested video frame is then created and attached to the cursor. This small digitized frame (SDF) can then be moved in tandem with the cursor from the video window to an edit window and released. Begin and end points of clips are created by releasing an SDF within an edit window under the appropriate column. Releasing an SDF within an edit window under the clip column causes that SDF to be entered as both the begin and end point of the clip. Numerous rows of edit windows can be created in a similar manner. When the begin and end edit windows in the same row are filled with different SDFs, the video frames between those respective points are digitized and automatically inserted into the clip column for that row in an animated form. SDFs can likewise be directly manipulated so as to modify the content or rearrange the sequence of edit windows within the clip list window.

DETAILED DESCRIPTION OF PREFERRED EMBODIMENT

Figure 3A:
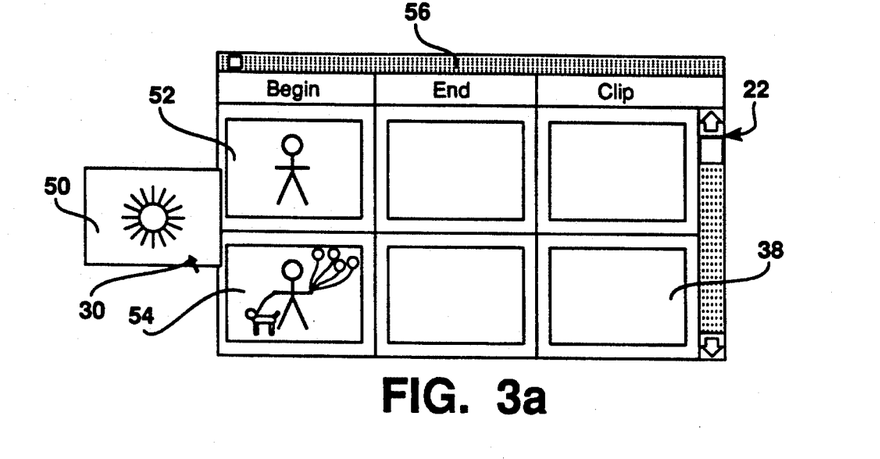
FIGS. 3a to 3c show a representation of the process for creating a new row of edit windows within the clip list window as such a sequence might appear on the display of the editing system.
Figure 3B:
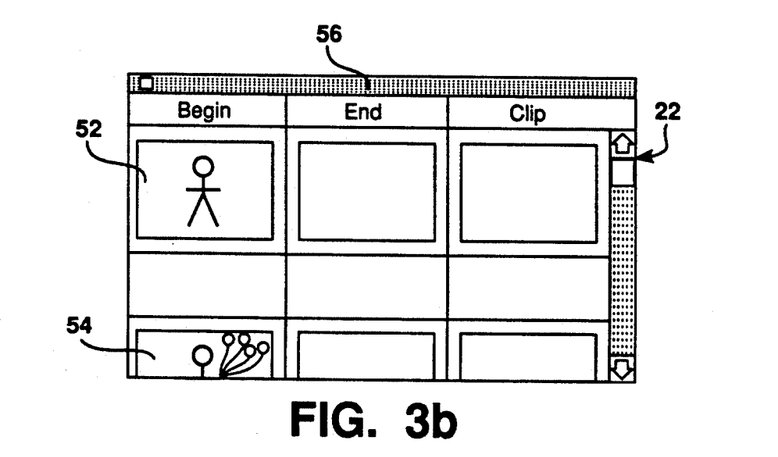
Figure 3C:
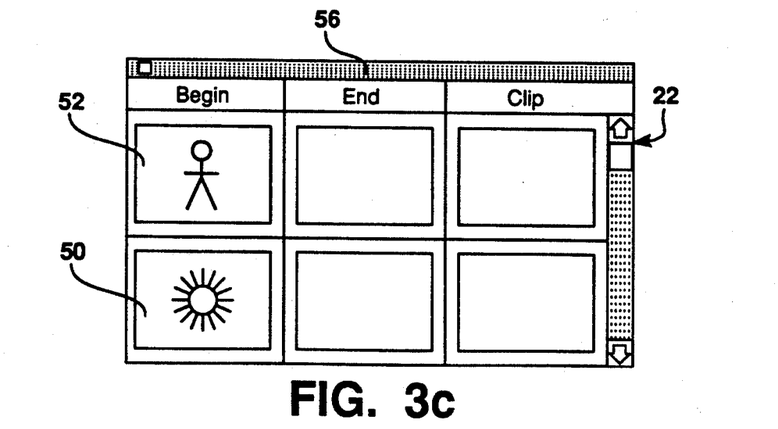
Figure 4A:
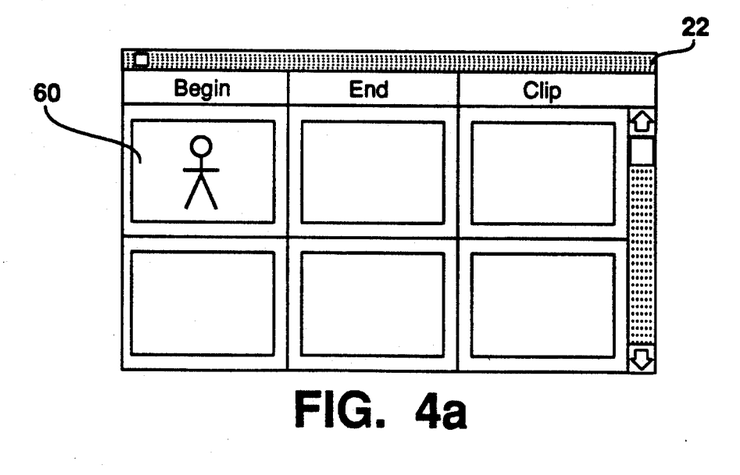
FIGS. 4a and 4b show a representation of the process of returning a begin frame to the video window as such a process might appear on the display of the editing system.
Figure 4B:
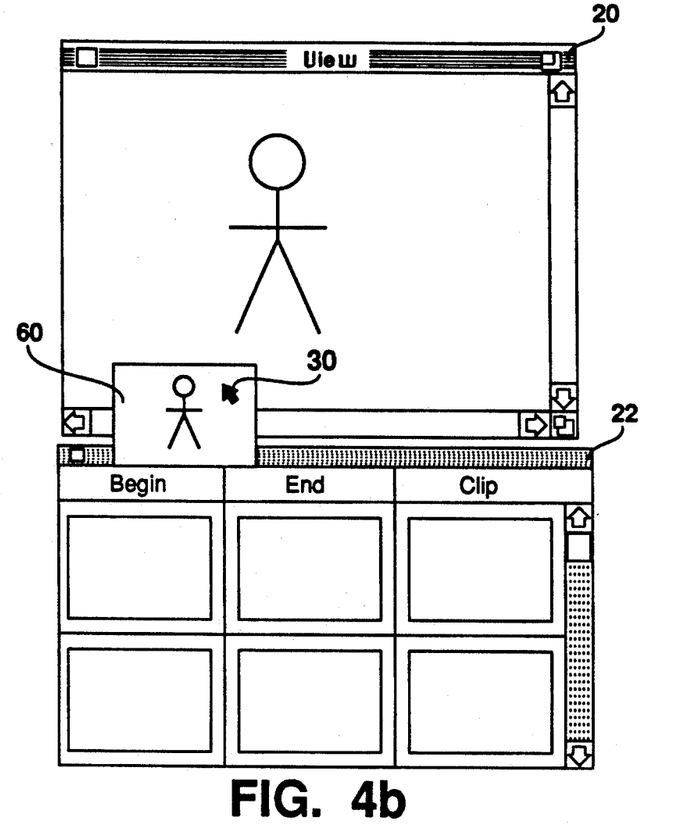
Figure 5:
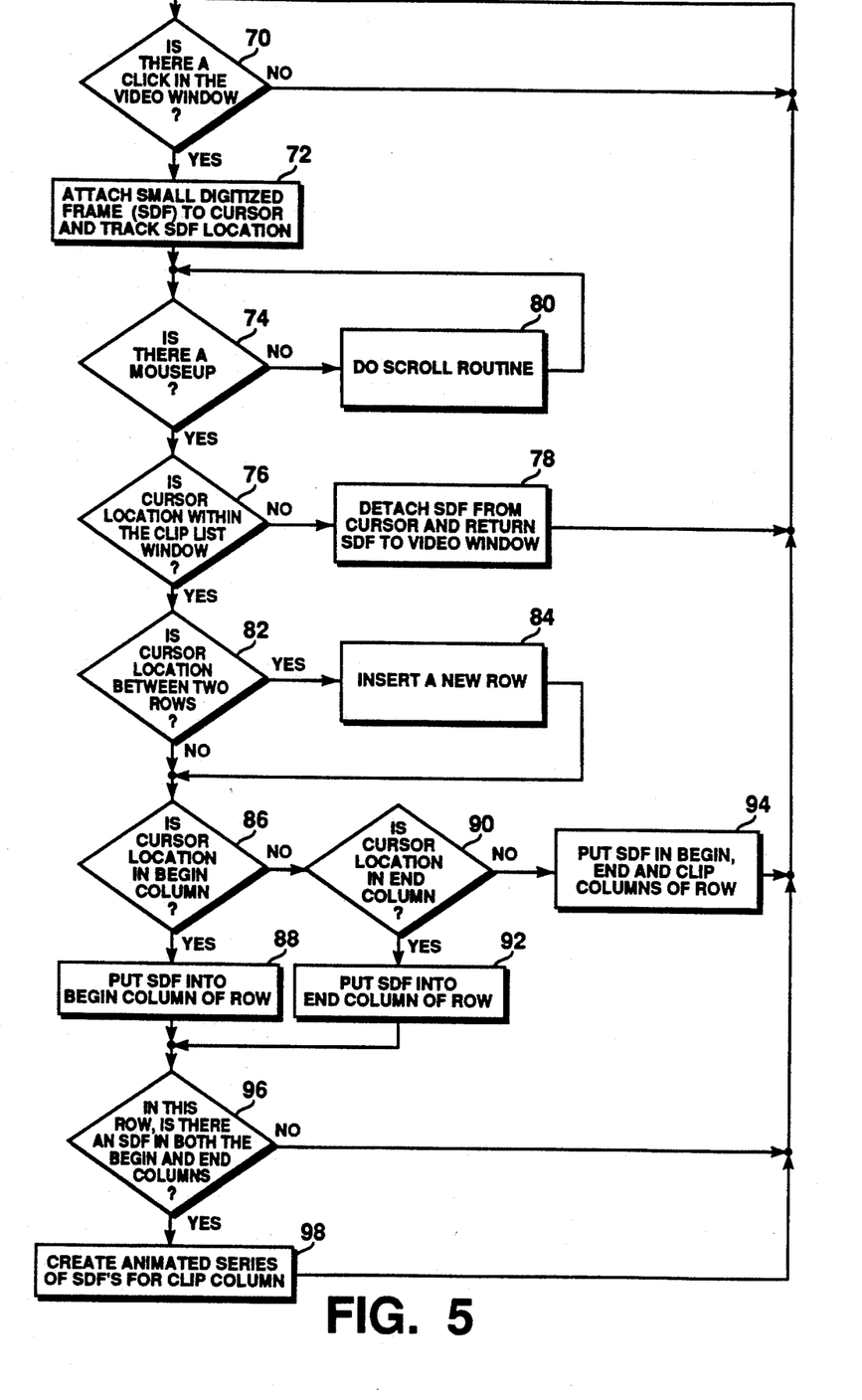
FIG. 5 shows a flowchart of the steps taken by the editing system in creating small digitized frames for placement within the edit windows of the clip list window.
Figure 6:
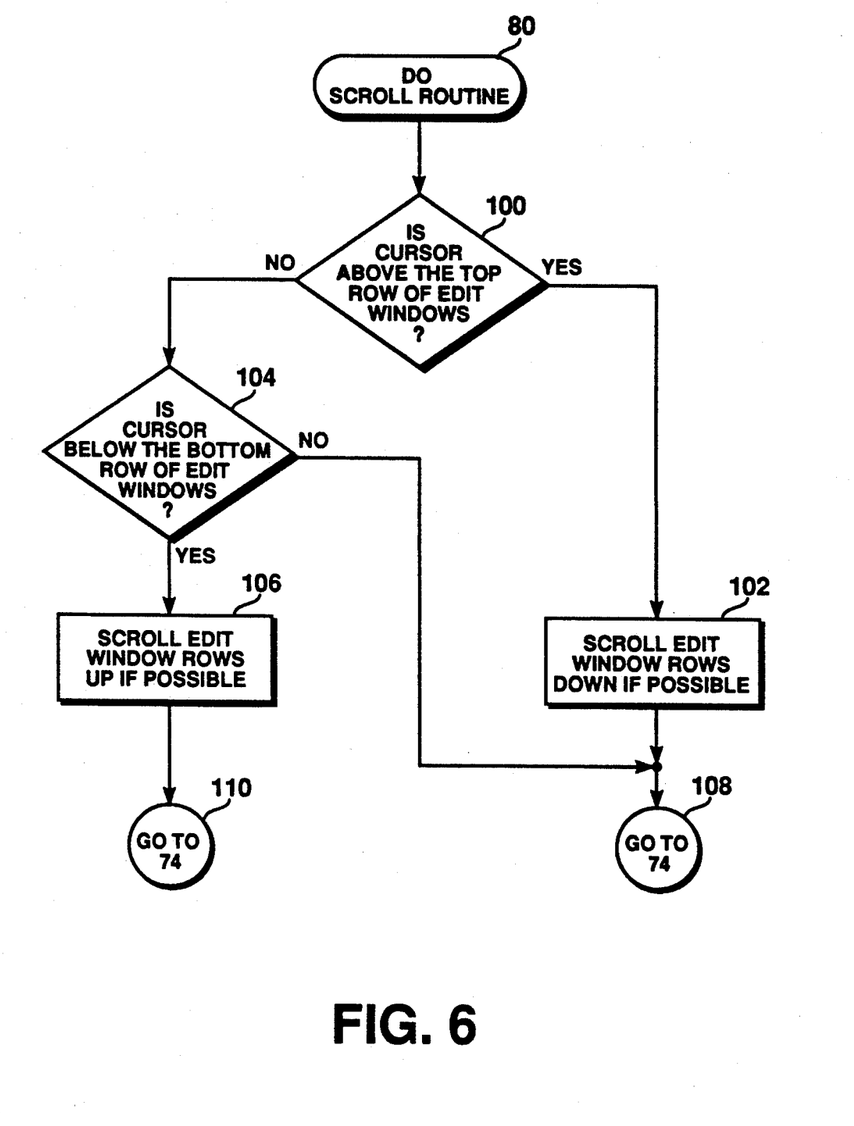
FIG. 6 shows a flowchart of the steps taken by the editing system when performing a scroll routine in accordance with the flowchart of FIG. 5.
Figure 7:
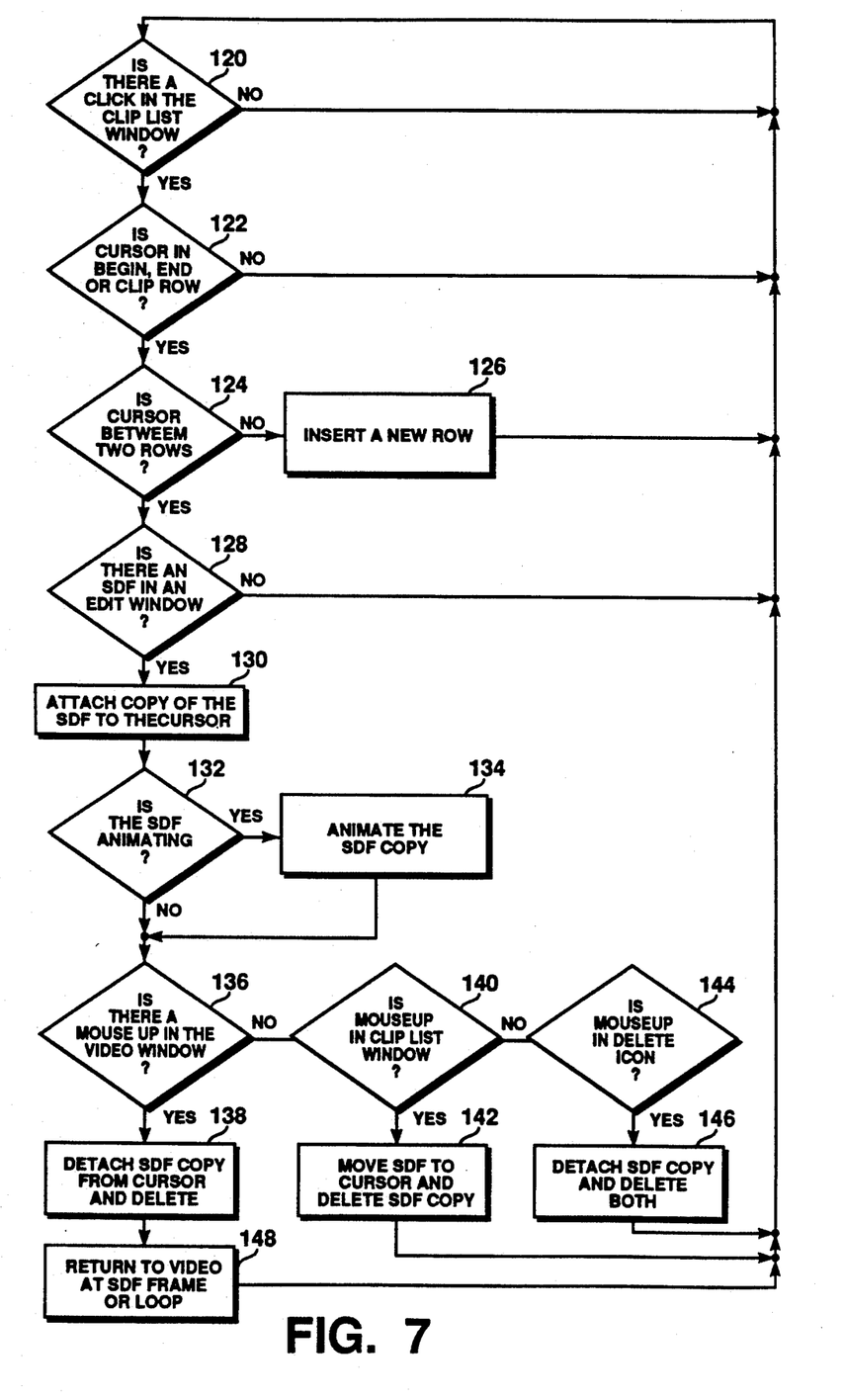
FIG. 7 shows a flowchart of the steps taken by the editing system when returning a small digitized frame to the video window.

A video editing system in accordance with the preferred embodiment of the present invention is depicted in FIGS. 1 through 4, with some of the methods for carrying out the present invention explained in greater detail in FIGS. 5 through 7. In general, with reference to FIG. 1, the editing system of the present invention is comprised of an analog video source 10 connected to a video processor/controller 12, which is in communication with a computer system 14 having a mass storage device 16, cursor control device 17, and a display device 18. Although the present invention is described as being used to edit video information, it could also be used to edit any type of information which could be represented on the computer's display.

Figure 1:
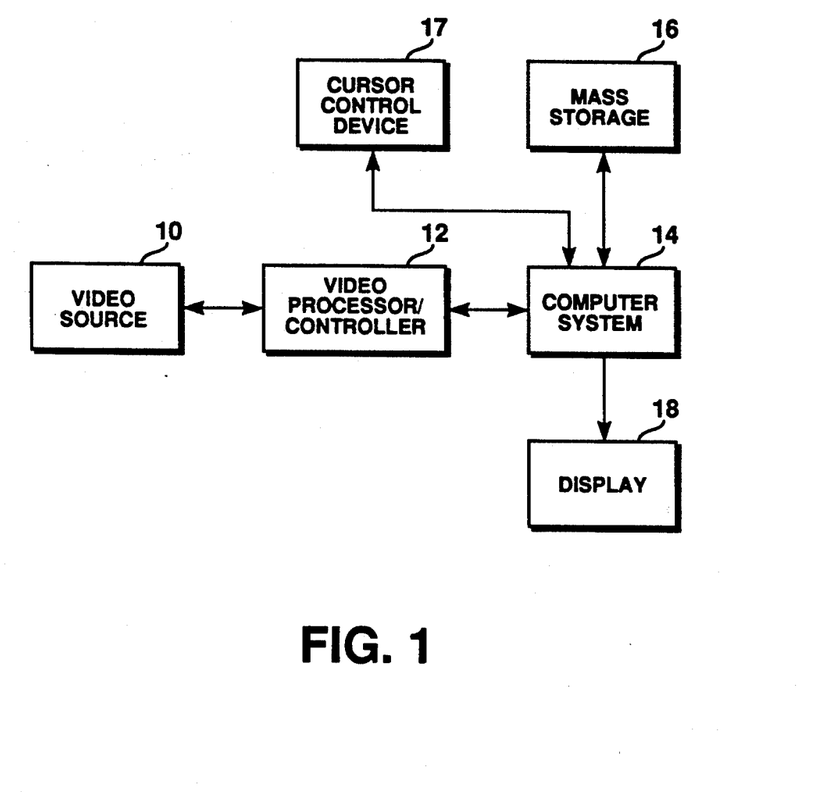
FIG. 1 shows a block diagram representing a video editing system in accordance with the preferred embodiment of the present invention.

The type of computer system to be utilized in combination with the present invention is also unlimited and could include any one of a broad range of different computers, such as the Macintosh ® computer manufactured by Apple Computer, Inc. of Cupertino, Calif., provided that the selected computer included appropriate hardware and software for communicating with the video source 10 and editing the video source's output. The video source 10, such as a video cassette recorder, optical disc player, camera (or other nonrepeatable information source), etc., is shown to be in direct communication with the video processor/controller 12, which obtains video information from the video source, controls the video source's operation, and outputs customized video information back to the video source after editing. The computer system could also be used to control the operation of the video source in place of the processor/controller 12, provided the computer system included a digitizer for converting the analog output of the video source 10.

Figure 2:
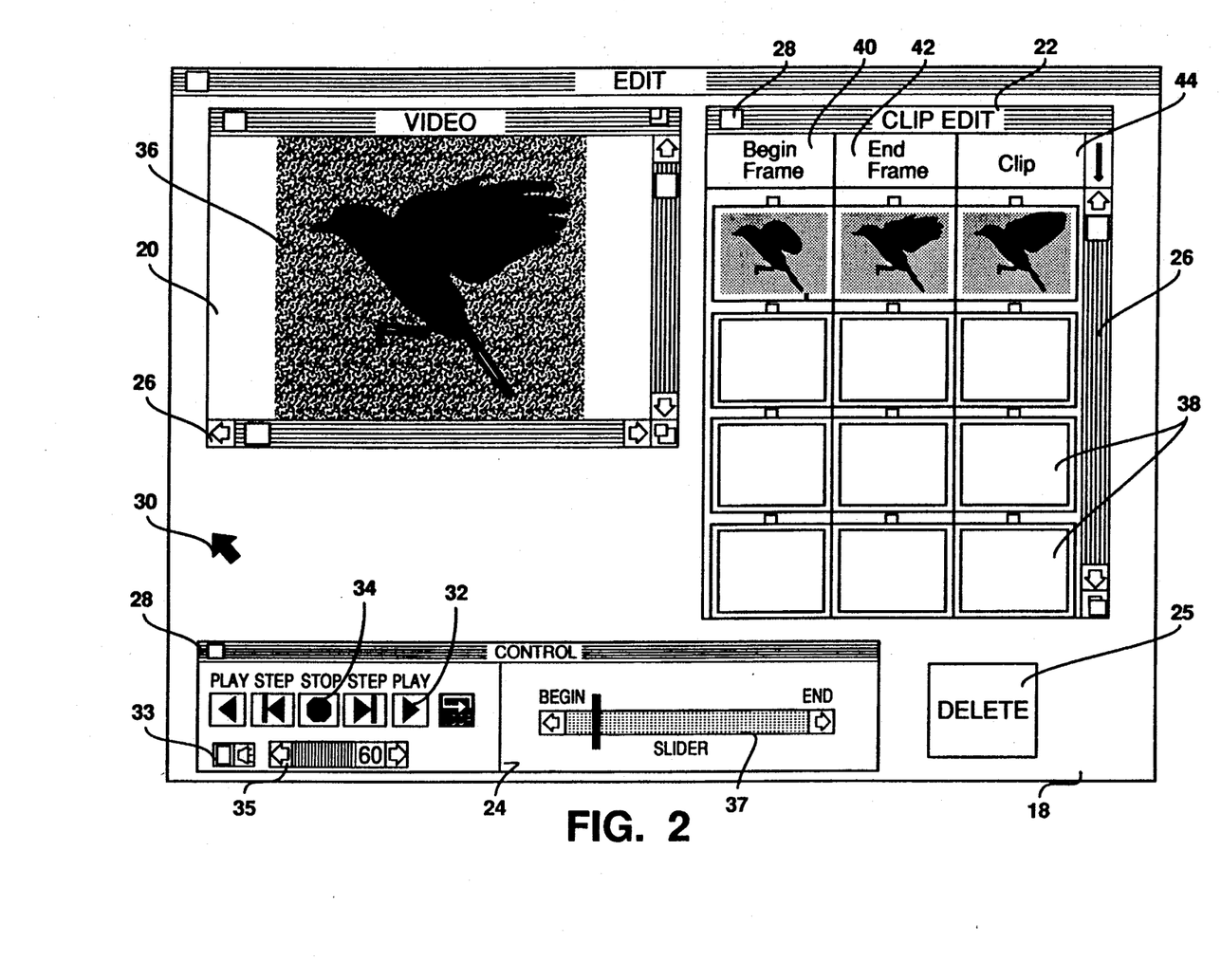
FIG. 2 shows a representation of a video window, control window and clip list window as each might appear on the display of the editing system of FIG. 1.

With reference now to FIG. 2, the basic operation of the editing system is illustrated. Upon initialization of the computer system and the software designed to operate the editing system, the user is presented with at least three operating windows on the computer system's display 18: a video window 20; a clip list window 22; and a control window 24. In some systems, the user could also be presented with certain functional icons, such as the delete icon 25, which would allow the user to conveniently dispose of unwanted programs or information by simply placing displayed objects corresponding to programs or information in the space of the delete icon 25, thereby indicating to the computer system that the programs or information are to be deleted. The processes for creating such functional icons and operating windows, even those having scroll/sizing bars 26 and close boxes 28, are well known in the art and need not be described here for an enabling disclosure of the present invention.

To display video information from the video source 10 in the video window 20, the user must first indicate to the editing system the type of video source to be utilized (i.e., VCR or laser-disc player) and the name and/or location of the desired video information to be displayed (i.e., the starting frame position or title of the section of information to be edited). Once this task has been accomplished, the user can then control the display of the video information through operation of the cursor control device 17, such as a mouse, keyboard, trackball, or a touch sensitive display or pad. By positioning the cursor 30 over the position of one of the software controlled radio buttons 32 of the control window 24 and clicking (depressing and releasing) the selection button of the mouse, the user can cause the video source to play or stop the illustration of video information in the video window 20. The video information, which is input to the video processor/controller 12 in an analog form, is digitized and output to the computer system 14, which includes an operating system software controlled microprocessor for further processing the video information and causing it to be displayed on the display 18 and/or stored in the mass storage 16.

In addition to the play and stop radio buttons 32, the control window also contains radio buttons for performing other standardized video source control functions, such as reverse-play, reverse-step, forward-step, and loop. Control window 24 also includes a radio button for sound play 33, a slider bar 35 for controlling playback speed in combination with the radio buttons 32, and a spring-loaded, one-state slider 37 which can be used in place of the radio buttons 32 to control the playback of the video information. The processes for creating and operating radio buttons 32, sound play button 33, slider bar 35, and one-state slider 37, are all well known in the art.

To mark a particular video frame or portion of video information for editing purposes, the user positions the desired video frame 36 in the video window 20, through use of the radio buttons or other control devices of the control window 24, and selects the video frame 36 with the mouse (i.e., clicks on the video frame with the selection button of the mouse). Upon being selected, the video frame is digitized and miniaturized to create a visual segment the size of one of the edit windows 38 of the clip list window 22. This visual segment is then adhered to the cursor 30 so that the small digitized frame (SDF) or visual segment can be moved out of the video window 20 and over to the clip list window 22. The process of dragging the SDF refers to the well known process of selecting a graphically displayed object with a mouse and moving the selected object in tandem with the cursor to a new position on the screen of the display.

An SDF can be placed within any of the edit windows 38 of the clip list window 22, which is comprised of a number of rows of edit windows 38 arranged in three columns. Although the edit windows 38 are shown as visible rectangles, they could be formed to represent any geometric shape desired and could even be invisible spatial areas within the clip list window 22. In each row of edit windows 38, the first column corresponds to a begin frame 40 of a video clip frame sequence for that row, the second column corresponds to the end frame 42 of the video clip frame sequence, and the last column corresponds to the video clip frame sequence 44 itself. Although one of the general definitions of the term "sequence" is that of a series, the video clip frame sequences 44 of the last column of edit windows 38, at least with respect to the present invention, can also be understood to refer to a single SDF, which occurs whenever the same SDF is placed by the user in both the begin frame 40 and the end frame 42. The same SDF will also be placed in both the begin frame and end frame 40 and 42 when the user places a single SDF in the clip frame sequence window 44 because the editing system understands such an action to indicate that the begin and end frames are to be the same.

When the SDF placed in the begin frame 40 is different from the SDF placed in the end frame 42 of the same row, the clip frame sequence 44 for that row is comprised of the SDFs of the begin and end frames 40 and 42 and all SDFs in between. To indicate that the clip frame sequence includes more than a single SDF, and to allow the user to view multiple clip frame sequences in their entirety, each clip frame sequence having more than one SDF is animated, meaning that it repeatedly displays all of the SDFs of the clip frame sequence at some preselected rate. This preselected rate can be a video standard framerate, such as NTSC (for 30 FPS (frames/second) or PAL (for 25 FPS)), or as otherwise desired by the user. For example, in FIG. 2, since the SDFs of the begin and end frames 40 and 42 of the first row, depicting a bird in flight, are from different portions of the video information being displayed in the video window 20, the clip frame sequence 44 for that row would be the animated series of SDFs inclusively between those frames, as indicated by the SDF depicting the same bird, but in a stage of flight different from that of either the begin or end frames.

Any SDF in one of the edit windows 38 can be changed in the same manner in which the SDF was originally created, such as by clicking on a desired video frame 36 from the video window 20 and dragging the new SDF into the edit window 38 having the old SDF to be replaced. SDFs can also be changed by replacing them with SDFs from other rows and/or columns. In situations where changing an SDF would change the SDFs in the clip frame sequence 44, the clip frame sequence is modified in accordance with the position of the new SDF.

In addition to giving the user the ability to close and resize the operating windows, scroll/sizing bars 26 allow the user to modify the number of rows of edit windows 38 displayed within the clip list window 22. For example, by clicking on the up/down arrows of the vertical scroll/sizing bar 26 of the clip list window 22 of FIG. 2, the user can scroll the rows of edit windows up or down respectively until all of the rows of edit windows (in this case, four at a time) have been displayed within the clip list window 22. Likewise, clicking on the arrows of the horizontal scroll/sizing bar 26 scrolls the rows of edit windows sideways. In accordance with the present invention, the user can also scroll rows of edit windows 38 up, down and/or sideways without having to use one of the scroll/sizing bars 26. For example, to scroll the edit windows depicted in FIG. 3a either up or down without clicking on the vertical scroll/sizing bar 26, the user need only move a new SDF 50 into the clip list window 22 and then move it (although it is the position of the cursor which is really sensed by the editing system) up or down past the top or bottom of the clip list window. The edit windows scroll up when the SDF 50 is moved up past the top of the clip list window 22 and scroll down when the SDF 50 is moved down past the bottom of the clip list window 22.

Rows of edit windows can also be added to the clip list window 22 utilizing similar direct manipulation techniques. As depicted in FIGS. 3a-3c, a new SDF 50 can be added between SDFs 52 and 54 by simply moving the new SDF 50 into a position overlapping both SDFs 52 and 54, thereby causing the editing system to create a new row between the rows of edit windows corresponding to SDFs 52 and 54 and inserting SDF 50 into the appropriate column.

With reference now to FIGS. 4a and 4b, it can be shown that direct manipulation techniques can also be employed to return the video window 20 to a particular frame of video. Through normal operation of the controls of the control window 24, the user can display any frame of the video information within the video window 20, but through direct manipulation techniques, the user can quickly return to any video frame that has previously been saved as an SDF in the clip list window 22. By dragging a miniaturized edit frame 60 away from one of the edit windows of the clip list window 22 and releasing it in the video window 20, the editing system will be prompted to recall the video frame number of the corresponding SDF and to direct the video source 10 to display the appropriate video frame in the video window 22. This particular feature of the editing system greatly simplifies the process of editing video clip sequences because the user no longer needs to utilize trim buttons to change video frames, or SDFs, within a particular clip. If the user wants to change the begin or end frames of a clip, the user can simply drag one of the SDFs into the video window to return the video source to the corresponding video frame, then use the controls of the control window to step the tape up to the desired video frame, and then grab that video frame and drag it back into the clip list window in place of the previous SDF.

A preferred embodiment for carrying out the process of directly manipulating video frames to create video clip sequences for editing video information is depicted in FIG. 5. When a click is detected in the video window, block 70, during the operation of the editing system, a miniaturized version of the selected video frame, SDF, will be created, block 72. The SDF adheres to the cursor until a mouseup command is detected and can be tracked as its position changes on the screen of the display. Upon the occurrence of a mouseup command, block 74, (i.e., the release of a depressed selection button of a mouse, or a key command equivalent), the editing system is prompted to determine if the position of the SDF (which corresponds to the position of the cursor, and therefore the position of the SDF at the time of the mouseup command) is somewhere within the clip list window 22, block 76, or outside of the clip list window 22, block 78. While waiting for a mouseup command to occur, the editing system is prompted to cycle through a scroll routine, block 80, further illustrated in FIG. 6, to determine if the user is not sending a mouseup command because the user wants to scroll the rows of edit windows in the clip list window. If the mouseup command is generated while the SDF is outside of the clip list window 22, the SDF will be detached from the cursor and returned to the video window 20, block 78, thereby prompting the editing system to wait for a new click to occur in the video window 20, block 70.

If the mouseup command is generated within the clip list window 22, the editing system is then prompted to determine if the mouseup location was between two rows of edit windows, block 82. If the mouseup location occurred between rows of edit windows a new row of edit windows, block 84, is added to the clip list window 22 at the position of the SDF, Mouseup commands occurring somewhere other than between two rows of edit windows but inside the clip list window 22 are assumed to have been generated within one of the edit windows. To determine which edit window the mouseup command was generated in, the editing system is first prompted to see if the mouseup command was generated in the begin column, block 86, in which case the SDF is placed in the appropriate row of the begin column, block 88. If the mouseup command was not generated in the begin column, the editing system is then prompted to see if the mouseup command occurred in the end column, block 90, in which case the SDF is placed in the end column of the appropriate row, block 92. If the mouseup command occurred in neither of these columns, the editing system is then prompted to place the SDF in the clip column, in which case the same SDF is also put in the other two columns of the appropriate row, block 94, since the video frame sequence only consists of a single video frame. When a single frame video clip sequence is created in this manner, the editing system is automatically prompted to return to block 70 to await another click in the video window.

When an SDF is first placed in the begin column, the editing system is prompted to determine if there is also an SDF in the end column, block 96. Likewise, the editing system checks to see if there is an SDF in the begin column when an SDF is first placed in the end column, block 96. If SDFs are found in both the begin and end columns, the editing system is then prompted to create an animated series of SDFs from the inclusive video frames of the video information between the begin frame and the end frame, block 98, and to insert that animated series, or clip, in the clip column of the same row of edit windows. If the begin and end columns of a row are not both filled, block 96, or if the editing system has already been prompted to create an animated series of SDFs in the clip column of that row, block 98, the system will be prompted to return to block 70 and await another click in the video window.

With reference now to FIG. 6, the scroll routine referred to above in block 80 of FIG. 5 will be further illustrated. While the editing system is waiting for a mouseup command to occur after creating an SDF from a video frame grabbed from the video window, it is prompted to cycle through the scroll routine of block 80. In the cycle routine, the editing system is prompted to first see if the cursor (the SDF) has moved above the top row of edit windows in the clip list window, block 100. If the cursor has moved above the top row of edit windows, the system is prompted to scroll the edit window rows down, block 102, if possible, until the edit window rows can be scrolled no further or until the cursor is moved below the scroll position. If the cursor was not moved above the top row of edit windows, the editing system is prompted to see if the cursor was moved below the bottom row of edit windows in the clip list window, block 104. If the cursor was moved below the bottom row of edit windows, the editing system is then prompted to scroll the edit window rows up, block 106, if possible, until the edit window rows can be scrolled no further or until the cursor is moved above the scroll position. If neither of the conditions of blocks 100 nor 104 are satisfied, then the editing system goes back to block 70 to see if a mouseup command has been issued, block 108. The system also returns to block 70 after it has finished scrolling the edit window rows, block 110 and block 108.

The process of returning an SDF to the video window 20 essentially follows the procedure set forth in FIG. 7, with some additional process steps included as well. The editing system is constantly prompted, block 120, to look for the occurrence of a click in the clip list window. When a click in the clip list window occurs, the editing system is prompted to determine the position of the cursor, block 122. If the cursor's position is determined to be within one of the columns, the editing system is then prompted to see if the cursor's position is between two rows of edit windows of that column, block 124. If the cursor's position is between two edit windows of the same column, the editing system is prompted to add a new row of edit windows at the point of the cursor's position, block 126, rather than move the SDF attached to the cursor back to the video window.

If the cursor's position at the time of the mouse click was in an edit window, the editing system looks to see if there is an SDF in that edit window, block 128, and, if so, attaches a copy of that SDF to the cursor, block 130. A copy of the SDF is attached to the cursor so that the user can still see the original SDF in the edit window while deciding what to do with the SDF copy. In addition to attaching the SDF copy to the cursor, block 130, the editing system is also prompted to check and see if that SDF corresponds to a static begin, end or clip frame, or an animated clip, of that row of the clip list, block 132. If the SDF is from an animated clip, the editing system will animate the SDF copy as well, block 134.

If the user decides to return the SDF copy to the video window, the user moves the SDF copy over to the video window and releases the selection button, thereby causing a mouseup command to be generated in the video window, block 136, and thereby prompting the editing system to detach the SDF from the cursor and delete it from the display, block 138. If the user moves the SDF copy to another position within the clip list window, block 140, the original SDF is moved to the new cursor position and the SDF copy is deleted, block 142.

In an alternative embodiment, the user could also use the delete icon 25 to remove SDFs, provided the software programs associated with the function of the delete icon 25 are modified so as to allow the delete icon to remove both the SDF copy and the original SDF when an SDF copy is dragged into the delete icon display space. Hence, moving the SDF copy to the delete icon 25, block 144, will prompt the editing system to assume that the user wants to completely remove the both the SDF copy and the original SDF in the edit window, therefore causing both the SDF copy and the original SDF to be deleted, block 146.

If the SDF is returned to the video window 20, the video source 10 is prompted to automatically return to the video frame position corresponding to the SDF, block 148. As explained above, this feature is particularly useful if the user wants to return to the position of the SDF to further edit a clip list row. For example, if the user had created a video clip sequence and then decided that the clip sequence should begin or end at a different frame, the user would not have to operate hardware trim buttons or goto buttons to change the sequence. To change a begin or end frame, the user would only have to put an SDF from either the begin or end column back in the video window, move the video information to the new frame position using the controllers of the control window 24, grab the new frame from the video window, and drag it over to the position of the old SDF. Likewise, the user could further edit a clip sequence by dragging an SDF from the clip column into the video window, thereby causing the video source 10 to automatically replay the video information in the same loop sequence as the SDF clip sequence, block 148.

Although the present invention has been described with reference to FIGS. 1-7 and with emphasis on a particular embodiment for carrying out the direct manipulation of video information for clip editing purposes, it should be understood that the figures and processes are for illustration of a preferred embodiment of the present invention only and should not be taken as limitations or thought to be the only means of carrying out the present invention. It is contemplated that many changes and modifications may be made to the present invention without departing from the spirit and scope of the invention as disclosed above.

We claim:

1. An apparatus for editing a video recording having a plurality of sequential images, said apparatus comprising:
    a display means for visually displaying said images of said video recording in a first portion of said display means;
    a control means for controlling a rate at which said images are displayed and an order in which said images are displayed on said first portion of said display means;
    a means for specifying a segment of said video recording by selecting a beginning image of said segment when said beginning image is displayed in said first portion of said display means and by selecting an ending image of said segment when said ending image is displayed in said first portion of said display, wherein said beginning image is displayed in a second portion of said display means and said ending image is displayed in a third portion of said display means; and
    a means for selecting one image of said video recording, said means for selecting allowing for said selected image to be substituted in place of said beginning image, resulting in a different number of images comprising said segment.

2. The apparatus of claim 1, wherein images comprising said segment are displayed in a fourth portion of said display means.

3. The apparatus of claim 2, wherein said images of said video recording, said beginning image, said ending image, and said images of said segment are digitized.

4. The apparatus of claim 1 wherein said means for selecting one image of said video recording comprises a cursor displayed on said display means and means for directing said cursor on said display means.

5. The apparatus of claim 4 wherein said means for selecting one image of said video recording also allowing for said selected image to be substituted in place of said ending image, resulting in a different number of images comprising said segment.

6. The apparatus of claim 1, wherein a plurality of various beginning and ending images specifying a plurality of various segments of said video recording are displayed on said display means.

7. The apparatus of claim 6 further comprising a means for selecting one of said plurality of various starting and ending images, wherein said video recording is sequenced such that said selected one of said plurality of various starting and ending images is displayed in said first portion of said display.

8. The apparatus of claim 7, wherein said plurality of various segments of said video recording are displayed on said display means.

9. The apparatus of claim 8 wherein said control means includes a first button displayed on said display means for selecting said rate at which said sequential images of said video recording are displayed and a second button displayed on said display means for selecting said order of said sequence of images.

10. The apparatus of claim 9 further comprising a scrolling means for scrolling said plurality of various starting and ending images and said plurality of various segments of said video recording on said display means.

11. The apparatus of claim 10 further comprising a means for inserting an additional beginning image, an additional ending image, and an additional segment in between two adjacent images of said plurality of various starting images, ending images, and segments.

12. A method of specifying a portion of a video recording comprised of a plurality of frames, each of said frames describing a visual image, said portion comprising a start frame, an end frame, and a plurality of frames in between said start frame and said end frame, said method comprising the steps of:
    accessing a frame of said video recording by displaying an image described by said accessed frame in a first part of a display screen;
    controlling a rate at which said images are displayed and an order in which said frames of said video recording are displayed such that a plurality of images described by a plurality of frames are displayed in said first part of said display screen;
    selecting said start frame when an image described by said start frame is displayed in said first part of said display screen;
    displaying said image described by said start frame in a second part of said display screen;
    selecting said end frame when an image described by said end frame is displayed in said first part of said display screen;
    displaying said image described by said end frame in a third part of said display screen; and
    substituting said start frame with a different start frame by selecting an image described by said different start frame as said image described by said different start frame is displayed in said first part of said display screen.

13. The method of claim 12 further comprising the step of displaying images corresponding to frames of said selected portion of said video recording in a fourth part of said display screen.

14. The method of claim 13 further comprising the step of digitizing images described by said frames comprising said video recording.

15. The method of claim 12 wherein said step of substituting said start frame with a different start frame by selecting an image described by said different start frame as said image described by said different start frame is displayed in said first part of said display screen comprises the steps of:
    moving a means for directing a cursor so that said cursor overlies said image described by said different start frame displayed in said first part of said display screen and selecting said image described by said different start frame while said cursor overlies said image described by said different start frame.

16. The method of claim 15 further comprising the step of substituting said end frame with a different end frame by selecting an image described by said different end frame as said image described by said different end frame is displayed in said first part of said display screen.

17. The method of claim 16 further comprising the step of selecting an image described by said start frame in said second part of said display screen wherein said start frame is accessed and said image described by said start frame is displayed in said first part of said display screen.

18. The method of claim 17 further comprising the step of selecting an image described by said end frame in said second part of said display screen wherein said end frame is accessed and said image described by said end frame is displayed in said first part of said display screen.

19. The method of claim 18 further comprising the steps of:

specifying a plurality of different portions of said video recording by selecting a plurality of different start and end frames;

displaying images described by said plurality of different start frames in said second part of said display screen;

displaying images described by said plurality of different end frames in said third part of said display screen.

20. The method of claim 19 further comprising the steps of:

displaying a first button on said display screen for selecting said rate at which said frames of said video recording are displayed;

displaying a second button on said display means for selecting said order by which said frames of said video recording are displayed.

21. The method of claim 20 further comprising the step of scrolling said images displayed in said second, third, and fourth parts of said display screen.

* * * * *